(12) United States Patent
Kitson et al.

(10) Patent No.: US 8,599,326 B2
(45) Date of Patent: Dec. 3, 2013

(54) METHOD OF MANUFACTURING A DISPLAY DEVICE WITH GREYSCALE CAPABILITY

(75) Inventors: Stephen Christopher Kitson, Bristol (GB); John Christopher Rudin, Bristol (GB); Adrian Derek Geisow, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1389 days.

(21) Appl. No.: 11/234,539

(22) Filed: Sep. 23, 2005

(65) Prior Publication Data

US 2006/0082710 A1    Apr. 20, 2006

(30) Foreign Application Priority Data

Oct. 18, 2004    (GB) .................................. 0423134.6

(51) Int. Cl.
*G02F 1/13*    (2006.01)
*G02F 1/136*    (2006.01)
*G02F 1/1333*    (2006.01)

(52) U.S. Cl.
USPC ................ 349/45; 349/85; 349/138; 349/187

(58) Field of Classification Search
USPC ...................... 349/45, 85, 138, 187
See application file for complete search history.

(56) References Cited

U.S. PATENT DOCUMENTS

| | | | | |
|---|---|---|---|---|
| 4,712,877 A | * | 12/1987 | Okada et al. ..................... | 349/85 |
| 4,763,985 A | * | 8/1988 | Bingham ....................... | 359/518 |
| 4,861,143 A | | 8/1989 | Yamazaki | |
| 5,066,109 A | * | 11/1991 | Kuratate et al. ................. | 349/85 |
| 5,080,467 A | * | 1/1992 | Kahn et al. ..................... | 349/161 |
| 5,126,865 A | * | 6/1992 | Sarma ............................. | 349/85 |
| 5,257,122 A | | 10/1993 | Dubal | |
| 5,568,292 A | * | 10/1996 | Kim ............................... | 349/110 |
| 5,737,051 A | * | 4/1998 | Kondo et al. .................. | 349/149 |
| 6,127,199 A | | 10/2000 | Inoue | |
| 6,151,153 A | * | 11/2000 | Bryan ............................ | 359/245 |
| 6,503,564 B1 | * | 1/2003 | Fleming et al. ............. | 427/255.6 |
| 6,522,382 B1 | * | 2/2003 | Rudin ............................ | 349/143 |
| 6,639,639 B2 | * | 10/2003 | Baek et al. ..................... | 349/113 |
| 7,271,863 B2 | * | 9/2007 | Paukshto et al. ................ | 349/96 |

(Continued)

FOREIGN PATENT DOCUMENTS

| | | |
|---|---|---|
| EP | 1089113 | 4/2001 |
| GB | 2 293 908 A | 4/1996 |

(Continued)

OTHER PUBLICATIONS

Translation of JP Office action & JP OA; Dated Feb. 8, 2012.

(Continued)

*Primary Examiner* — Jessica M Merlin

(57) ABSTRACT

A method of manufacturing a cell wall assembly for an electro-optic display device with greyscale capability comprises:
forming on a substantially planar surface of a transfer carrier, at least one dielectric structure;
forming on said at least one dielectric structure at least one electrode structure;
wherein said dielectric structure extends in a direction perpendicular to said surface by a distance which varies substantially within the area of the or each electrode structure;
adhering said at least one electrode structure to a major surface of a substrate of glass or a plastics material; and
removing the transfer carrier.
Other aspects of the invention include the cell wall assembly, a device with greyscale capability, a method of manufacturing the device, and the transfer carrier.

9 Claims, 11 Drawing Sheets

(56) References Cited

U.S. PATENT DOCUMENTS

| | | | |
|---|---|---|---|
| 2003/0008437 A1* | 1/2003 | Inoue et al. | 438/149 |
| 2004/0036817 A1* | 2/2004 | Paukshto et al. | 349/56 |
| 2004/0144953 A1* | 7/2004 | Sikharulidze | 252/299.01 |
| 2004/0239824 A1* | 12/2004 | Ahn et al. | 349/41 |
| 2005/0094052 A1* | 5/2005 | Sakurai et al. | 349/58 |
| 2005/0275780 A1* | 12/2005 | Hisatake | 349/120 |
| 2006/0066803 A1* | 3/2006 | Aylward et al. | 349/158 |

FOREIGN PATENT DOCUMENTS

| | | | |
|---|---|---|---|
| JP | 61-166590 | | 7/1986 |
| JP | 62-145216 | | 6/1987 |
| JP | 62262022 A | | 11/1987 |
| JP | 63-038902 | | 2/1988 |
| JP | 4-069620 | | 3/1992 |
| JP | 8-129162 | | 5/1996 |
| JP | 11-312811 | | 11/1999 |
| JP | 2002-537113 | | 11/2002 |
| JP | 2004-102272 | | 4/2004 |
| KR | 1-1998-101865-5 | * | 10/2003 |
| WO | WO-98/04953 A | | 2/1998 |

OTHER PUBLICATIONS

European Search Report from European Patent Office; mailed Jun. 7 2006; issued in related EP Application No. 05104572.2.

* cited by examiner

METHOD OF MANUFACTURING A DISPLAY DEVICE WITH GREYSCALE CAPABILITY

FIELD OF THE INVENTION

The present invention relates to display devices which have greyscale capability, and to methods and components for manufacturing the devices.

BACKGROUND TO THE INVENTION

Many display devices use a layer of electro-optic material which changes at least one optical property when a suitable electric field is applied across it. Examples of electro-optic materials include nematic or smectic liquid crystals and electrophoretic materials. Liquid crystal displays (LCDs) typically comprise opposed planar substrates (cell walls) with electrodes on the inner surface of each wall. The substrates are spaced apart and enclose a layer of a liquid crystal (LC) material. An alignment layer or structure may be provided on the inner surface of each substrate, over the electrodes, to induce a desired uniform alignment of molecules of the LC material. Typically, electrodes on one surface may comprise rows of parallel conductive strips and electrodes on the other surface may comprise columns of parallel conductive strips at right angles to the rows. Picture elements (pixels) are defined by the overlap of row and column electrodes. When sufficient voltage is applied at a pixel, the LC material in the pixel is switched from its surface-aligned state to a different alignment state. The display includes means for distinguishing between the different states, for example one or more polarisers. In conventional nematic LCDs, the LC material reverts to the surface-aligned state when the electric field is removed from a pixel. Row and column electrodes are easy to manufacture, but conventional nematic liquid crystal displays require quite complex matrix addressing (multiplexing), and the number of pixels that can be addressed is limited.

An alternative to this passive matrix addressing is active matrix addressing, wherein each pixel is activated by a thin film transistor (TFT) which is part of an array. The transistor maintains the pixel in the required state until the display is next refreshed. A problem with active matrix displays is that large area TFT arrays are difficult to manufacture, particularly on polymer substrates.

Bistable displays offer a route towards high-complexity, high-quality, low-cost electronic displays. Each pixel can be switched either dark or light and will remain switched even after the applied voltage is removed. Complex displays with good contrast and viewing angle can be constructed without active matrix addressing. Known bistable displays use ferroelectric smectic LC materials. More recently, bistable displays have been developed which use nematic LC materials and microstructures to support two different LC alignments, for example as disclosed in EP 1 139 151 and EP 1 271 226. However, in order to be able to show full colour it is desirable that an LCD can display shades of grey.

It has been proposed in U.S. Pat. No. 4,712,877 to provide a ferroelectric LCD with greyscale by providing an insulating film on an inner surface of one cell wall, with ITO (indium-tin oxide) transparent electrodes on top of the film. The thickness of the film varies within a pixel so that the distance of the electrode on the film from a conventional planar electrode on the other cell wall varies. The ferroelectric LC has a threshold electric field above which switching occurs, but below which switching does not occur. The electric field strength experienced by the ferroelectric LC material for a given electrode voltage differs within the pixel so that at a lower applied voltage some areas of a pixel will experience an electric field above the threshold and be in an 'on' state and some areas will experience an electric field below the threshold and be in an 'off' state. At a higher applied voltage more or all of the pixel will be switched to the 'on' state. A problem with this approach is that the thickness of the LC layer varies, which compromises the optical performance of the display and ultimately limits the number of accessible grey levels. Another problem lies with the difficulty of forming ITO electrode structures on a film of varying thickness on a cell wall. Further problems are inherent in the use of ferroelectric materials, relating to the difficulty of obtaining uniform alignment in a robust display, and of obtaining a ferroelectric LC material with a sufficiently wide operating temperature range.

U.S. Pat. No. 5,257,122 describes an alternative ferroelectric LCD with greyscale capability. In this device, one of the cell walls is not uniformly planar and parallel with the other. One cell wall either has steps or a slope on which are formed electrode structures, while the other cell wall is planar and has planar electrodes. An alignment (orientation) layer is provided on the stepped or sloping electrode structures, in such amounts as to fill in the steps or gradient so as to present a substantially planar alignment surface to the layer of ferroelectric LC material, the alignment surface being parallel with the other cell wall. This device has a uniformly thick layer of LC material but suffers from the same problems inherent with all ferroelectric devices, and with the difficulty of manufacturing stepped glass and infilling with an alignment layer to provide a sufficiently smooth surface. The demonstration cell described in U.S. Pat. No. 5,257,122 is not a guide to practical device fabrication.

SUMMARY OF THE INVENTION

According to an aspect of the present invention there is provided a method of manufacturing a cell wall assembly for an electro-optic display device with greyscale capability, the method comprising:
  forming on a substantially planar surface of a transfer carrier, at least one dielectric structure;
  forming on said at least one dielectric structure at least one electrode structure;
  wherein said dielectric structure extends in a direction perpendicular to said surface by a distance which varies substantially within the area of the or each electrode structure;
  adhering said at least one electrode structure to a major surface of a substrate of glass or a plastics material; and
  removing the transfer carrier.

The transfer carrier preferably has a substantially planar transfer surface, and this planarity defines surface quality of the cell wall assembly. By using a carrier with a highly planar surface, the invention may provide a final, highly planar surface to the cell wall assembly without the need for a separate planarising operation. An advantage of the method is that the surface quality of the display substrate does not need to be very good. If a polariser is laminated on the inner surface of the substrate, then birefringence of the substrate becomes unimportant and a substrate with uncontrolled birefringence can be used for manufacturing display devices which use electro-optic materials whose birefringence changes when switched. The surface of the transfer carrier is preferably electrically conductive, so that busbars may be formed within the dielectric structures by electro-depositing of a metal, using the transfer surface as an electrode.

It is preferred that the major surface of the substrate is substantially planar.

In a preferred embodiment the thickness of the adhesive layer is varied such that the two sides of the cell wall assembly are substantially parallel.

To facilitate energising of the electrode structures the method may further comprise forming at least one busbar by electro-depositing a metal in the dielectric structure and forming at least one of the electrode structures in contact with the busbar. Electro-deposited metal has a characteristic grain structure and materials composition which can be measured. Electro-deposited metal can therefore be differentiated from metal deposited by other techniques. See, for example, "Modern Electroplating"—4th Ed Schlesinger & Paunovic pub. Wiley. Chapter 1 sections 7.3 and 7.4.

Preferably, a plurality of busbars is formed in the dielectric structure and each electrode structure is in contact with a busbar. The busbars will typically be linear structures that will extend along the length of the cell wall. Any desired spacing may be used, for example they may be 50 to 200 µm apart, notably about 100 µm apart, and they may be many meters in length. It will be understood that the term 'cell wall' is used herein, where the context permits, to refer to a display substrate which may be used as manufactured or which may be formed into a plurality of separate pieces, each of which may be used to construct a display.

Other display components, such as colour filters, UV-filters, and polarisers or other optical films may optionally be formed on the transfer carrier and transferred to the substrate with the electrode structures and dielectric structure. The term "optical film" is used herein to denote a film which modifies at least one property of light incident thereon. If a polariser is laminated on the inner surface of the cell wall then birefringence of the cell wall becomes unimportant and a cell wall with uncontrolled birefringence can be used.

The dielectric structures may be formed on the carrier by any suitable means, for example embossing, micromoulding, laser ablation or photolithography. In a preferred embodiment the dielectric material is optically transparent and is formed by UV micromoulding, as taught in WO 96/34971, the content of which is incorporated herein by reference.

Once the dielectric structures and busbars have been formed a transparent conducting material (eg, PEDOT:PSS [HC Starck Baytron P] or ITO) is applied and, if required, patterned, for example using a serial (eg, laser ablation) aligned technique. PEDOT may be applied by any suitable coating techniques, notably by inkjet printing.

The busbars and electrode structures are transferred by adhesive onto the cell wall. The alignment of the busbars and electrode structures relative to each other on the transfer carrier is preserved on the cell wall Another aspect of the invention provides a cell wall assembly comprising:
  a first substrate of a glass or plastics material having a substantially planar surface;
  a plurality of electrode structures provided on said surface, at least a part of each electrode structure being spaced from said surface by a spacing material and including a busbar of electro-deposited metal; and
  a dielectric covering material which overlies at least a part of the or each electrode structure so as to provide a substantially planar surface;
  wherein the shortest distance of a surface of each electrode structure from the planar surface of the dielectric covering material varies substantially within the area of each electrode structure.

Typically, the electrode structures will have a length which is much greater than their width and the distance of a surface of each first electrode structure from the planar surface of the first substrate varies substantially within the width of the electrode structure. Overlap of the first electrode structure with a second electrode structure in a display device will produce a display in which the distance from the LC layer varies substantially within the area of each pixel.

The cell wall assembly may optionally be provided with an alignment layer or structure for inducing one or more desired alignments in adjacent molecules of LC material when incorporated into a display, in a manner known per se.

Another aspect of the invention provides a display device with greyscale capability, comprising:
  a first cell wall of a glass or plastics material spaced apart from and opposed to a second cell wall;
  a layer of an electro-optic material between the cell walls, said layer being of substantially uniform thickness;
  a plurality of first electrode structures provided on an inner surface of said first cell wall and at least one second electrode structure provided on an inner surface of said second cell wall, overlapping regions of first and second electrode structures defining pixels;
  a plurality of busbars of electro-deposited metal, each of which is in electrical contact with one of said first electrode structures;
  the electro-optic material being switchable from a first optical state to a second optical state when subjected to a suitable waveform of applied electric field;
  wherein the shortest distance between the electro-optic material and at least one of the electrode structures varies substantially within the area of a pixel whereby electro-optic material in a first region of a pixel will be subjected to a higher electric field strength than electro-optic material in a second region of that pixel when a voltage is applied via a first and second electrode across the pixel so that electro-optic material in said first part of said pixel will switch at a lower applied voltage than electro-optic material in said second part, thereby providing greyscale capability.

By substantially varying the shortest distance between the electro-optic material and one of the electrodes within the area of a pixel, the electric field strength exerted on the material varies. Thus, for a display with a threshold voltage, at a lower applied voltage only some of the pixel will switch, while at higher applied voltages, more or all of the pixel will switch. Thus, each pixel has greyscale capability. The greyscale capability is achieved by subpixel halftoning rather than by having more than two stable states or by any temporal dithering. The terms 'threshold voltage' and 'threshold electric field' refer respectively to the minimum voltage applied to the electrodes and the minimum electric field applied across the electro-optic medium to achieve switching. For a bistable display the threshold electric field is that needed to switch the electro-optic material from a first stable state to a second stable state. After removal of the electric field the material will remain in the second state until driven back to the first state by a suitable different electric field. For a monostable display with a threshold, the term 'threshold electric field' or 'switching threshold' refers to the minimum electric field needed to switch the electro-optic material from one optical state to another, for example changing a twisted nematic LC to a substantially homeotropic alignment. After the electric field is removed, the electro-optic material reverts to its original optical state.

A display without a threshold is capable of continuous inherent grey levels but it is not possible to passively matrix. The effect of the variation in field strength across the pixel in this case leads to a modification and quantisation of the overall electro-optic response.

In one embodiment, the shortest distance between the electro-optic material and a first electrode structure varies substantially continuously, for example by having the electrode structures slope at a nonzero angle in relation to a substantially flat surface of the electro-optic material. In another embodiment, the shortest distance varies in a series of discrete steps, either by forming the first electrode structures with discrete steps or by forming a series of dielectric steps on top of planar first electrode structures. The steps do not need to be evenly spaced in plan or in vertical height.

The term "electro-optic material" is used herein to denote a material which changes at least one optical property when a suitable electric field is applied across it. The optical property may be visible to the naked eye, for example in an electrophoretic display in which coloured or opaque charged particles migrate to a substrate under an applied electric field of appropriate sign. Suitable electrophoretic materials are well known to those skilled in the art of electro-optic display device manufacture. The electro-optic material may comprise a nematic or smectic liquid crystal. For a liquid crystal material the change in optical property may be visible to the eye (for example a change from a clear to a scattering texture) or the different optical states may be distinguished by means such as a dissolved pleochroic dye and/or one or more polarisers in ways well known in the art of LCD manufacture per se. For convenience the invention will be described herein with reference to liquid crystal display devices, but it will be understood that the invention is not limited to LCDs.

In a preferred embodiment the display is bistable, for example a post-aligned bistable nematic or a hole-aligned bistable nematic display as described, respectively, in EP 1 139 151 and EP 1 271 226 the contents of which are incorporated herein by reference. In another embodiment the display may be an electrophoretically-controlled bistable nematic device, for example as described in GB 2 394 781, the contents of which are incorporated herein by reference.

In order to switch the LC between stable states the electric field applied across the LC has to exceed the threshold. By putting the dielectric step between the electrode and the LC the electric field experienced by the LC will be reduced. Thus the applied voltage needed to switch the LC can be controlled by varying the thickness of the steps. Increasing the amplitude of a switching pulse will cause more of the steps to switch and hence increase the proportion of the device that switches into one of the two states, ultimately reaching a fully-switched state. The eye averages the areas of the pixel that are in each state to give a perceived grey level.

In an alternative embodiment the display may be an active matrix display in which pixels are defined by overlap of rectangular electrodes driven by transistors in a TFT array on one substrate with a continuous electrode on the other substrate. As alternatives to bistable display modes, the display may operate in various LCD modes, for example twisted nematic (TN), supertwisted nematic (STN) or hybrid aligned nematic (HAN). The LC material may optionally be chirally doped for device applications that require the LC to adopt a twisted structure, or to produce tilted smectic ferroelectric materials. For displays in which the LC has an electro-optic threshold, for example TN or STN, some parts of a pixel may be substantially completely switched (where the electric field experienced by the LC exceeds the threshold) while other parts (where the electric field experienced by the LC is below the threshold) are substantially unswitched. Greyscale is obtained by subpixel halftoning. In display modes without a sharp threshold voltage, such as HAN, the LC will switch more with increasing electric field up to a maximum field strength at which the pixel is fully switched. Thus, grey levels within a pixel may vary continuously where the minimum distance between the LC and an electrode varies continuously across the pixel, or the grey levels may be quantised as a series of steps, where the minimum distance varies discontinuously as series of steps.

A dielectric covering material overlies at least a part of the first electrode structures so as to present a substantially planar surface to the layer of liquid crystal material, substantially parallel to the inner surface of the second substrate. The inner surfaces of the first electrode structures may be spaced from the first substrate by one or more dielectric materials or by one or more conductors applied to the first substrate. Preferably, the spacing material is a dielectric material which may conveniently be an adhesive material that adheres to the substrate itself or to a polariser or other optical film affixed to the substrate. An inner surface of a substrate in contact with the layer of LC material is provided with a suitable alignment layer to enable the LC to be switchable between either of two stable states (eg in PABN mode). This device provides a bistable nematic LCD which has planar cell walls and a constant LC layer thickness.

The amount by which a dielectric step reduces the electric field experienced by the LC layer for a given voltage applied between the first and second electrodes will depend on the dielectric constant of the material of the step. For a typical dielectric such as SU-8 10 (Microchem) and a particular device—in this case a PABN display—we have found that each 100 nm step increases the switching threshold (ie, the external potential difference that needs to be applied between the first and second electrodes to achieve switching) by about 1 V. The values may be different for different display modes. Preferably the shortest distance between the first or second electrode and the LC varies by at least 100 nm within the area of a pixel. In a preferred embodiment, a surface alignment is provided on the first electrode structures, inducing a single substantially uniform alignment to adjacent molecules of the liquid crystal material. For a PABN cell, the surface alignment preferably induces local homeotropic alignment, an inner surface of the second substrate being textured with posts to provide bistability. However, each surface alignment could also be provided on the other substrate.

The electrode structures may be spaced from the LC material by a wedge of a dielectric material, to provide a continuously varying minimum distance between an electrode and the LC material, or by a series of dielectric steps provided on the electrodes. A preferred minimum dimension for each step, in plan view through a cell wall, is 10 μm. A particularly preferred minimum dimension is in the range 20-100 μm. Typically, the maximum dimension in plan view will be the length of the cell wall.

There may optionally be provided on top of each grey-level dielectric step, alignment features such as a grating structure, or posts or holes such as in a PABN or HABN cell. If alignment features are provided, several of these will be provided on top of each dielectric step.

According to a further aspect of the invention there is provided a method of applying to a display substrate transparent electrode structures and addressing busbars in a defined alignment relative to each other, the method comprising the steps of:
  (a) forming on a substantially planar surface of a transfer carrier, a series of dielectric structures each of which has a length and a width and which extends in a direction perpendicular to said surface by a distance which varies substantially within said width, each dielectric structure comprising electrode-receiving surface regions separated by a levee, adjacent dielectric structures being spaced apart to define a trench therebetween;

(b) forming said busbars by at least partially filling each of said trenches with an electrically-conductive material;

(c) depositing a layer of a translucent conductor material on said electrode-receiving surface regions and in contact with said busbars to form a series of electrode structures defined by said levees;

(d) affixing said electrode structures and levees to a display substrate by means of a dielectric adhesive material; and (e) removing said transfer carrier.

Other aspects and benefits of the invention will appear in the following specification, drawings and claims.

The invention will now be further described, by way of example only, with reference to the following drawings.

DETAILED DESCRIPTION

Figure 1A:
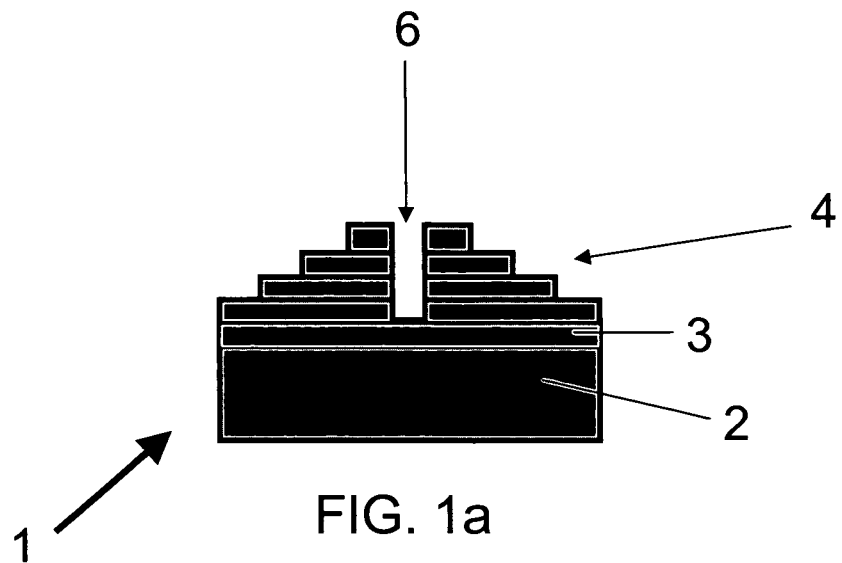
FIGS. 1 and 2 illustrate stages in the manufacture of a cell wall assembly having busbars and electrode structures in a predetermined alignment, in accordance with an embodiment of the present invention.

In the drawings, different parts have been enlarged or reduced to aid illustration of the invention. The drawings are therefore not to scale.

A transfer carrier 1 is shown in FIG. 1a. The carrier 1 comprises a base film 2 on which is coated a planar conductive layer 3. The carrier 1 may be rigid or flexible. In this example, the base film 2 comprises 150 µm thick PET and the conductive layer 3 is copper metal of about 1 µm thickness. In this example, the copper layer 3 is optically flat and has been passivated by immersion in 0.1 N potassium dichromate solution for 5 minutes, rinsed with deionised water and air-dried. Alternatively, the base film may itself be a conductor.

Figure 1B:
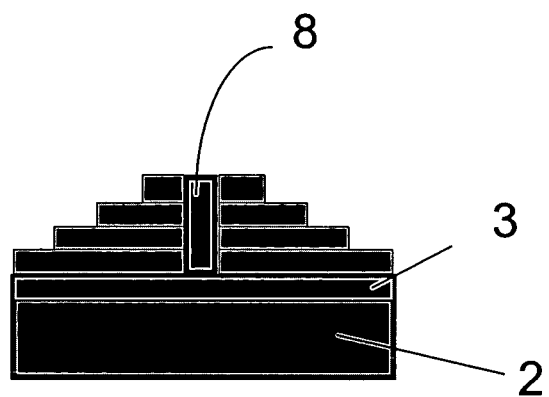
Figure 8:
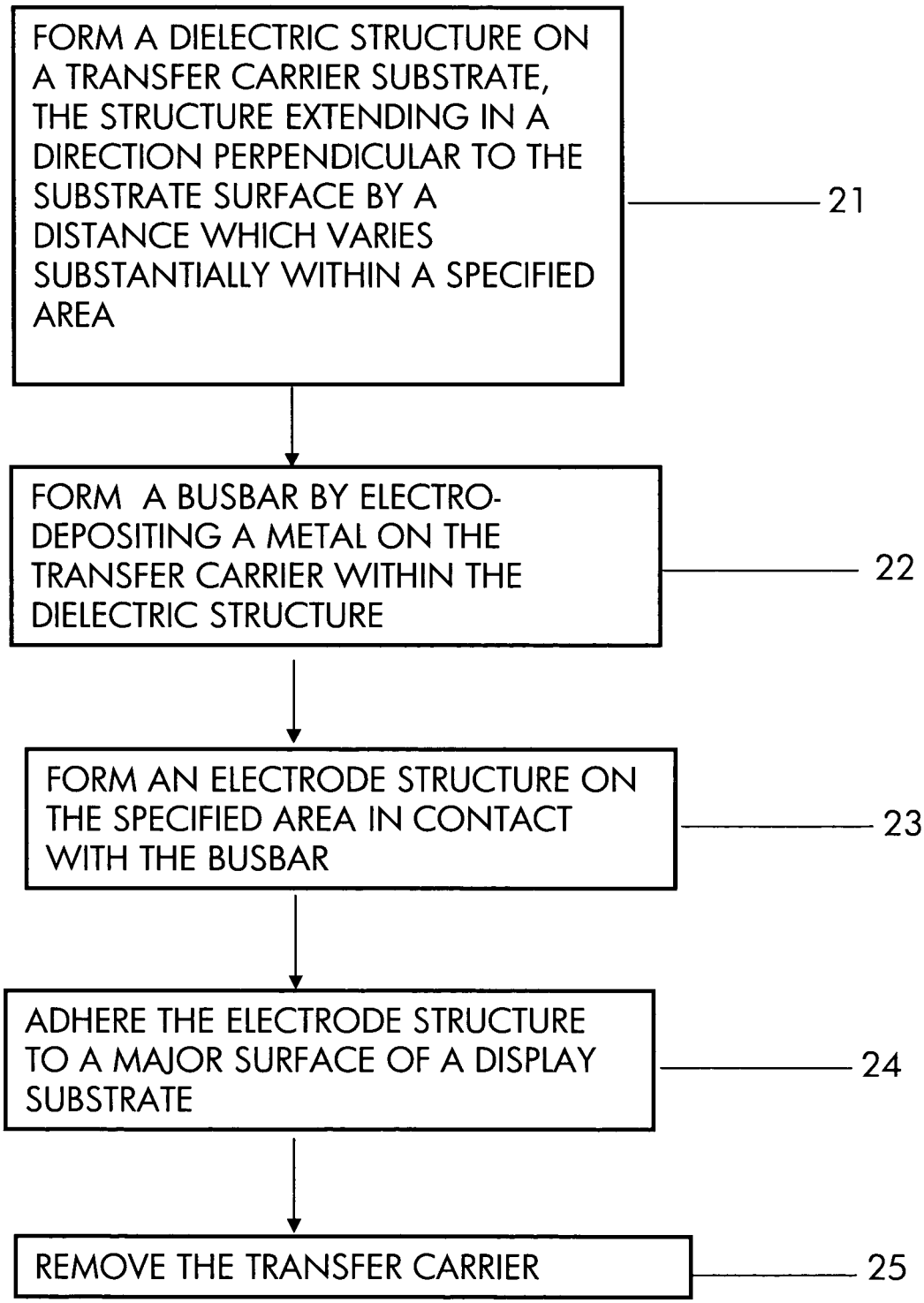
FIG. 8 is a flowchart illustrating steps in carrying out a method in accordance with an aspect of the invention.

Referring to FIGS. 1a and 8, the first general step, designated as block 21 is to form a multiple-level pattern of dielectric steps 4 on the surface of the conductive layer 3 of the carrier 1. In this example the dielectric steps 4 are formed by embossing a polymer structure. The dielectric material is optically transparent and could be formed by alternative techniques, for example by micromoulding as taught in WO 96/35971. A trench 6 is formed in the dielectric structure 4. If necessary, the trench 6 is plasma-etched to remove polymer from the bottom of the trench 6. Metal, in this example nickel, is then electroplated into the trench 6 to form a busbar 8 (FIG. 1b) (block 22, FIG. 8). It is preferred that the conductor 3 forms the cathode of an electrolytic cell with a nickel anode and standard nickel sulphamate-based electrolyte. Plating may be carried out with DC, with pulsed or biased AC current used to fill in the trenches 6 completely. Other known electrodeposition techniques may be employed. Suitable metals include nickel, copper and gold. The busbars 8 are linear structures which will run across the length or width of the display substrate to which they are transferred. They are typically about 100 µm apart and up to many metees in length. The busbars 8 are about 5×5 µm is cross-section and have a low resistance that in use will apply an applied voltage evenly across the device. The metal of the busbar 8 is opaque but it is small enough not to reduce the aperture too much.

Figure 1C:
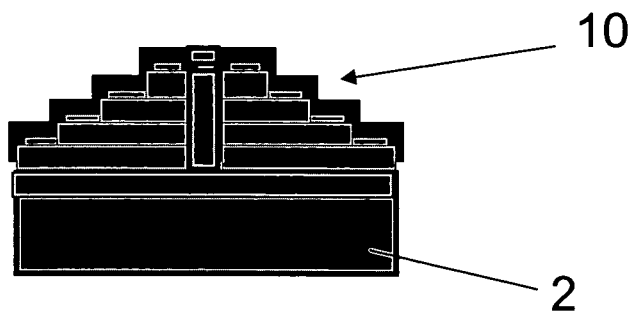

In the next general step, designated as block 23, at least one electrode structure is formed on the dielectric structure 4. To form electrode structures, a transparent conductor 10 is deposited onto the dielectric structure 4 and busbars 8, as illustrated in FIG. 1c. The conductor 10 may comprise indium oxide, tin oxide, indium tin oxide (ITO) or the like, but is preferably an organic conductor such as PEDOT:PSS (HC Starck Baytron P), which may be applied by a printing technique such as inkjet printing. The transparent conductor is then selectively etched or bleached to provide transparent electrodes 10. Standard photolithographic techniques can be used to prevent the conductor contacting more than one busbar 8. In the preferred embodiment, PEDOT:PSS is selectively bleached by UV light to form the electrode structures. Alternatively, standard photoresists and etching or chemical deactivation may be employed.

It will be understood that, for simplicity, only a single dielectric structure 4, busbar 8 and electrode track 10 are shown. A plurality of similar dielectric structures, busbars and electrode structures will be formed, each electrode structure 10 typically comprising one of a series of parallel row or column electrodes.

After forming the electrode structures 10, the resulting structure is treated with a transparent transfer adhesive 14 and the final display substrate 12 is laminated and the adhesive 14 is cured (FIG. 2a) (block 24, FIG. 8). In a preferred embodiment the transfer adhesive 14 is a UV-curable material such as NOA81 (Norland Optical Products) but may be thermal- or moisture-cured. The display substrate 12 is preferably a plastics material, for example PEN (DuPont Teijin Teonex Q65), PES (Sumitomo Bakelite) or polyArylate (Ferrania SpA-Arylite), but could comprise glass, preferably a UV-translucent glass.

Figure 2A:
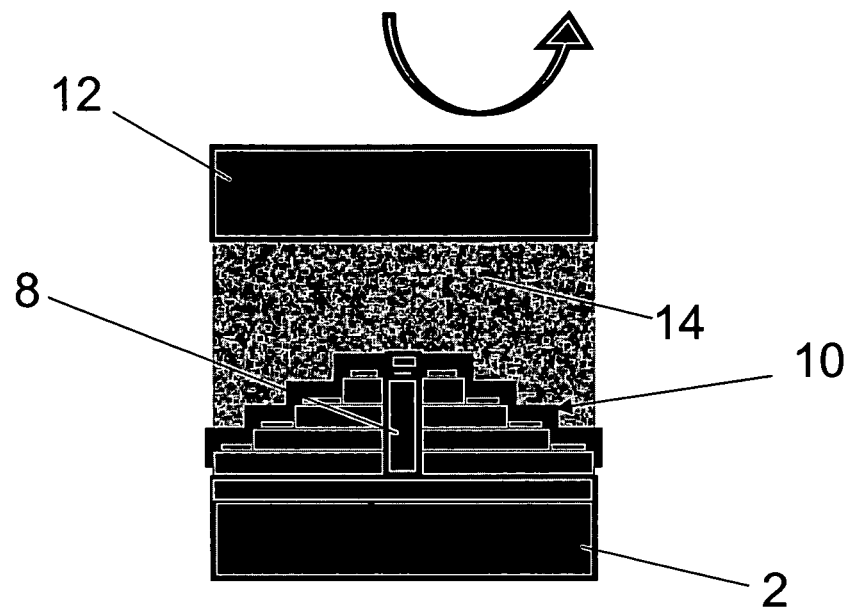

In the next general step, designated as block 25, the transfer carrier 1 is removed leaving the cell wall assembly 5. The adhesions in the assembly shown in FIG. 2a are tuned such that when the transfer carrier 1 is peeled off, the adhesion breaks at the surface of the conducting carrier substrate 3. The whole of the rest of the structure remains adhered to the display substrate 12, as illustrated in the cell wall assembly 5 of FIG. 2b. This surface is flat so that the resulting LC layer will be a constant thickness. The electrode structures 10, however, are embedded at different distances from the cell wall 12. The distances are set by the initial embossing of the dielectric structures 4 (now a dielectric covering layer for the electrode structures 10).

Figure 4:
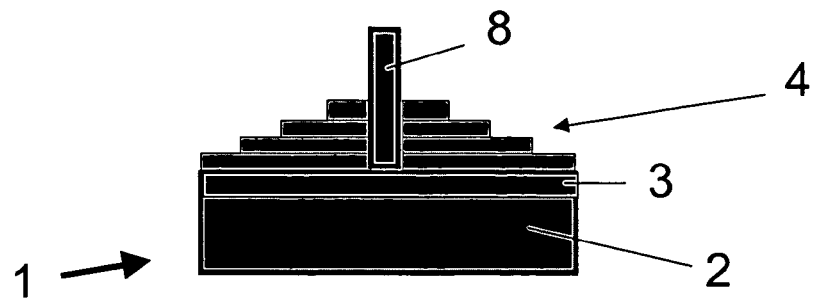
FIG. 4 illustrates a stage in the manufacture of a cell wall assembly in accordance with another alternative embodiment.

In this embodiment, one of the dielectric steps 4 is the full thickness of the busbar 8. It may be desirable to make the steps less than the full thickness of the busbar 8 to avoid increasing the switching threshold too much. The width of the step could be kept small to minimise the non-switching region. Alternatively, the initial trench 6 may be made somewhat shallower and the metal may be overplated to form a busbar 8 that extends beyond the dielectric structures 4 as illustrated in FIG. 4.

Turning now to FIG. 3, an alternative process for providing an electrode-patterned substrate is illustrated. The transfer carrier 1 of FIG. 3a is similar to that of FIG. 1a except that the embossing 4 includes additional raised lines or walls 101 (levees) which are significantly taller than the surrounding features and define the boundaries of the pixel or electrode line. Typically the levees 101 are from 4-10 µm tall and 3-7 µm wide. Preferably they have a smooth surface to reduce the wetting of the subsequent coatings. In FIG. 3b the busbar 8 is formed in the trench 6 in a similar manner to that of FIG. 1b. A liquid solvent-based transparent conductor 103 (eg a dispersion of PEDOT:PSS [HC Starck Baytron P]) is coated into the areas (channels or pixels) defined by the levees 101. The coating process may be any known deposition technique, preferably gravure or flexo-gravure coating, or inkjet deposition. The dispersion 103, in this example PEDOT:PSS dries and forms a substantially uniform layer 10 to form the transparent conductor. The surface properties of the embossing resin 4 are such that the film formation provides a uniform coating while preventing any coating over the levees 101. The layer 10 makes ohmic contact with the busbar 8. As illustrated in FIG. 3e, the bottom corners of the levees 101 may include an internal radius 104 feature matched to minimise the meniscus effect forming an undesirable thicker conductive region closer to the levee.

Figure 2B:
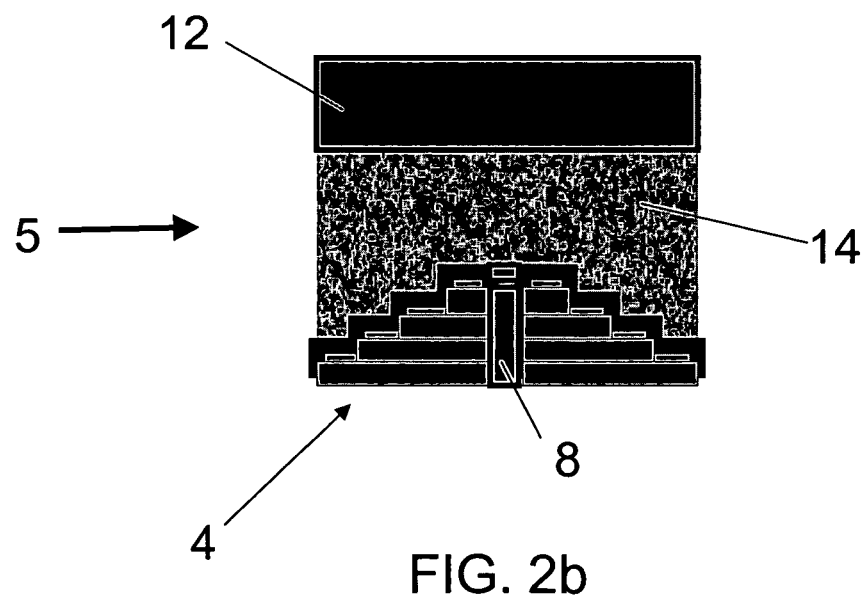
Figure 3A:
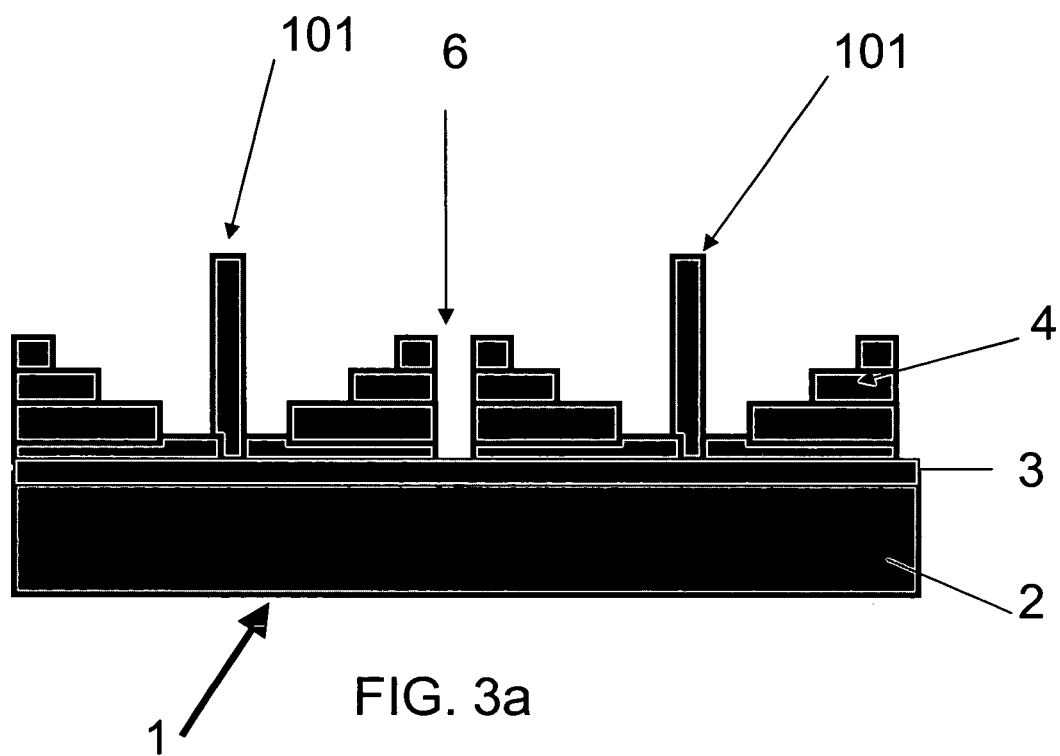
FIG. 3 illustrates stages in the manufacture of a cell wall assembly in accordance with an alternative embodiment of the invention.
Figure 3B:
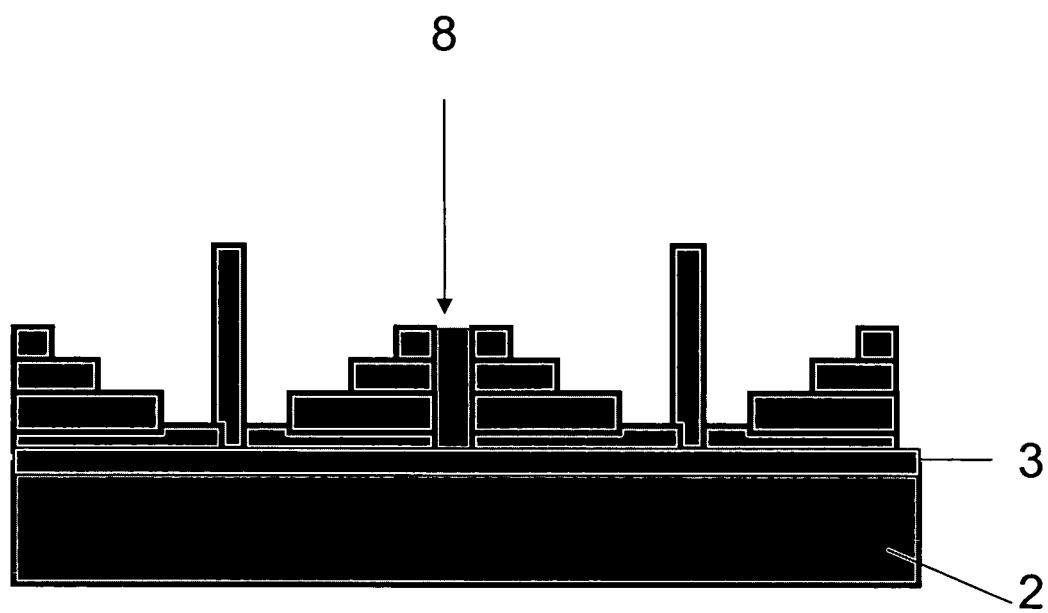
Figure 3C:
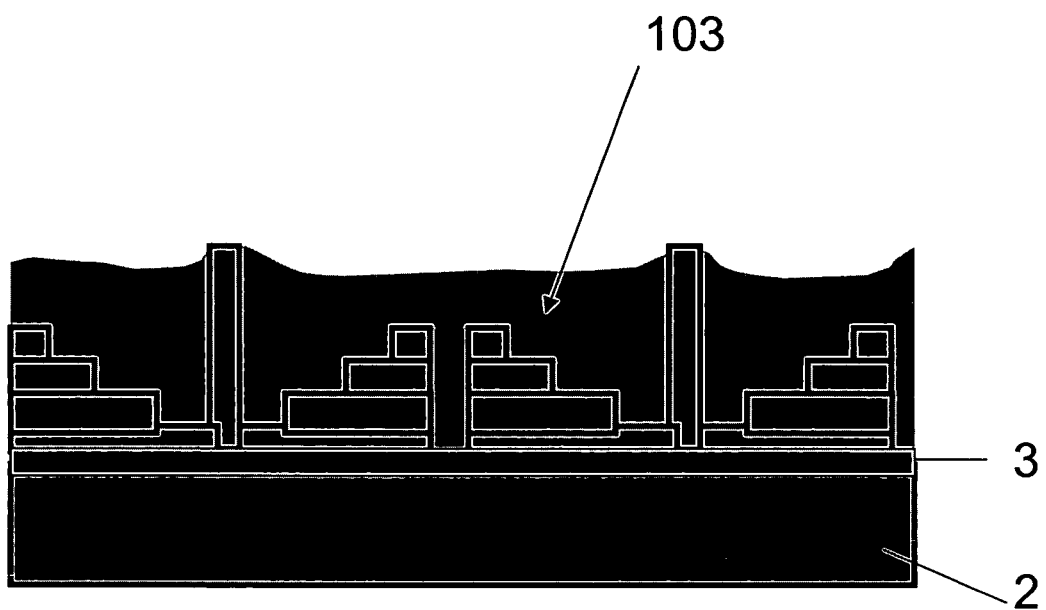
Figure 3D:
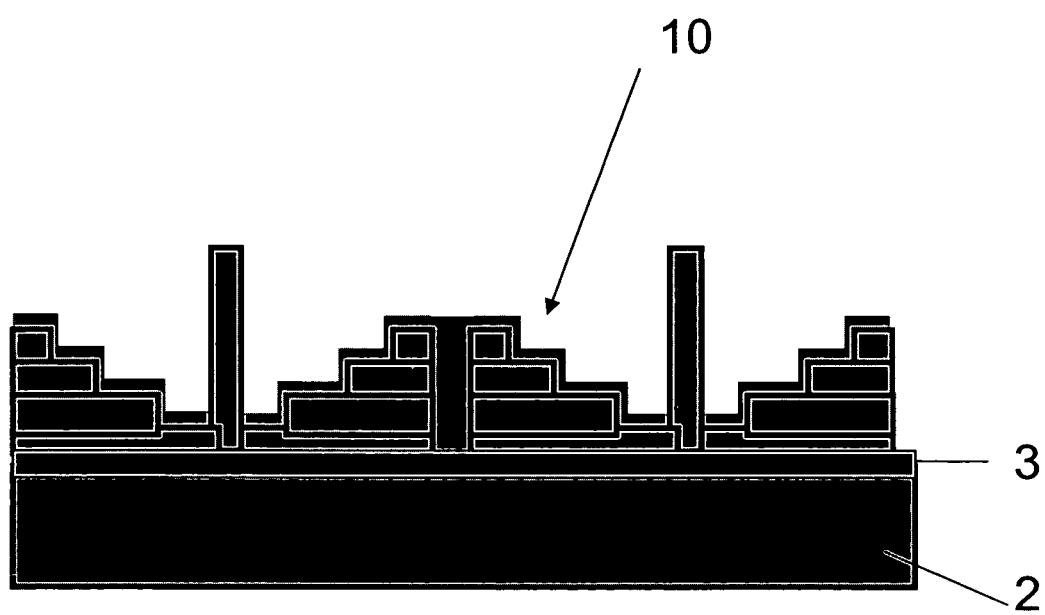
Figure 3E:
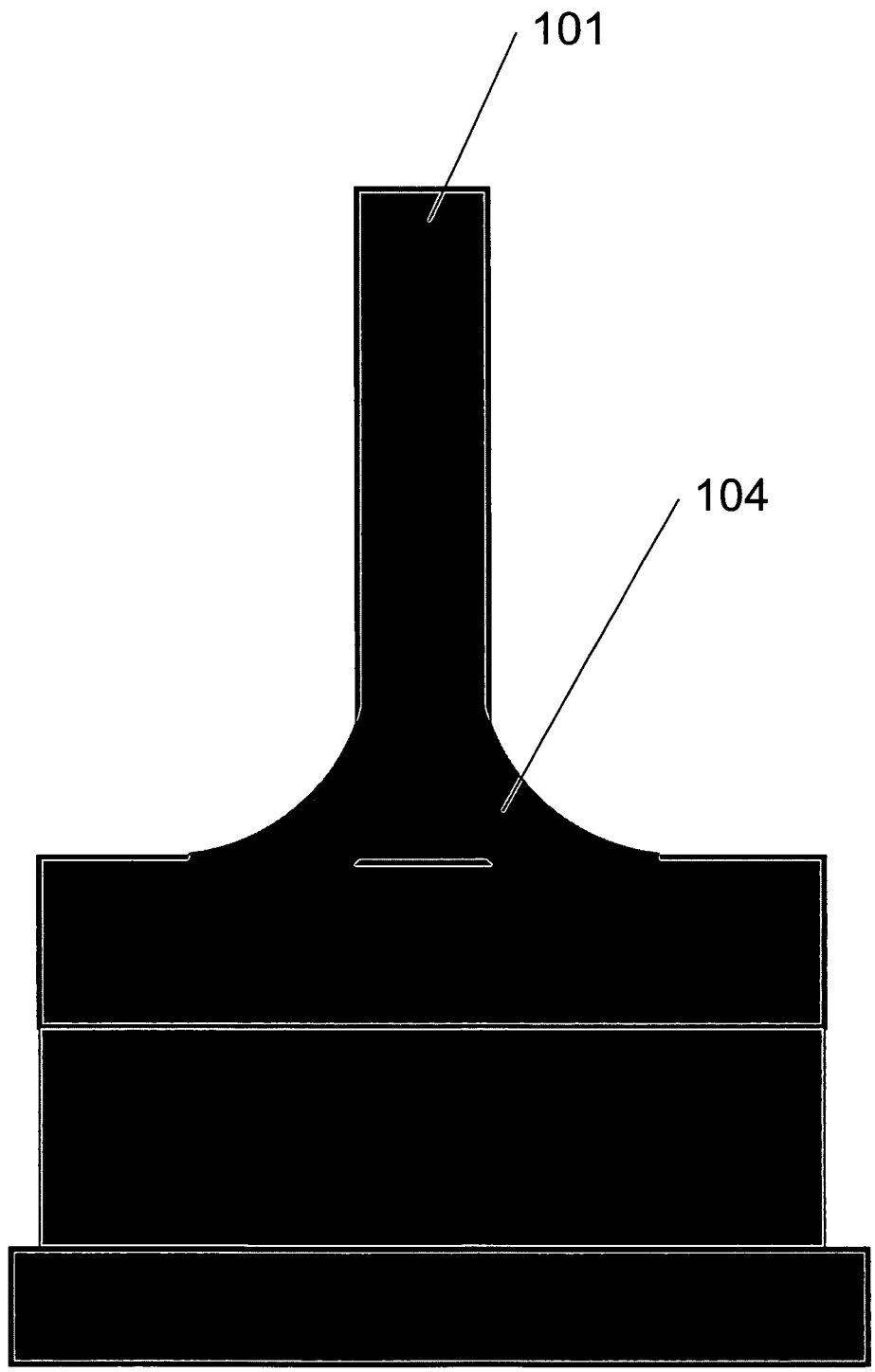
Figure 5:
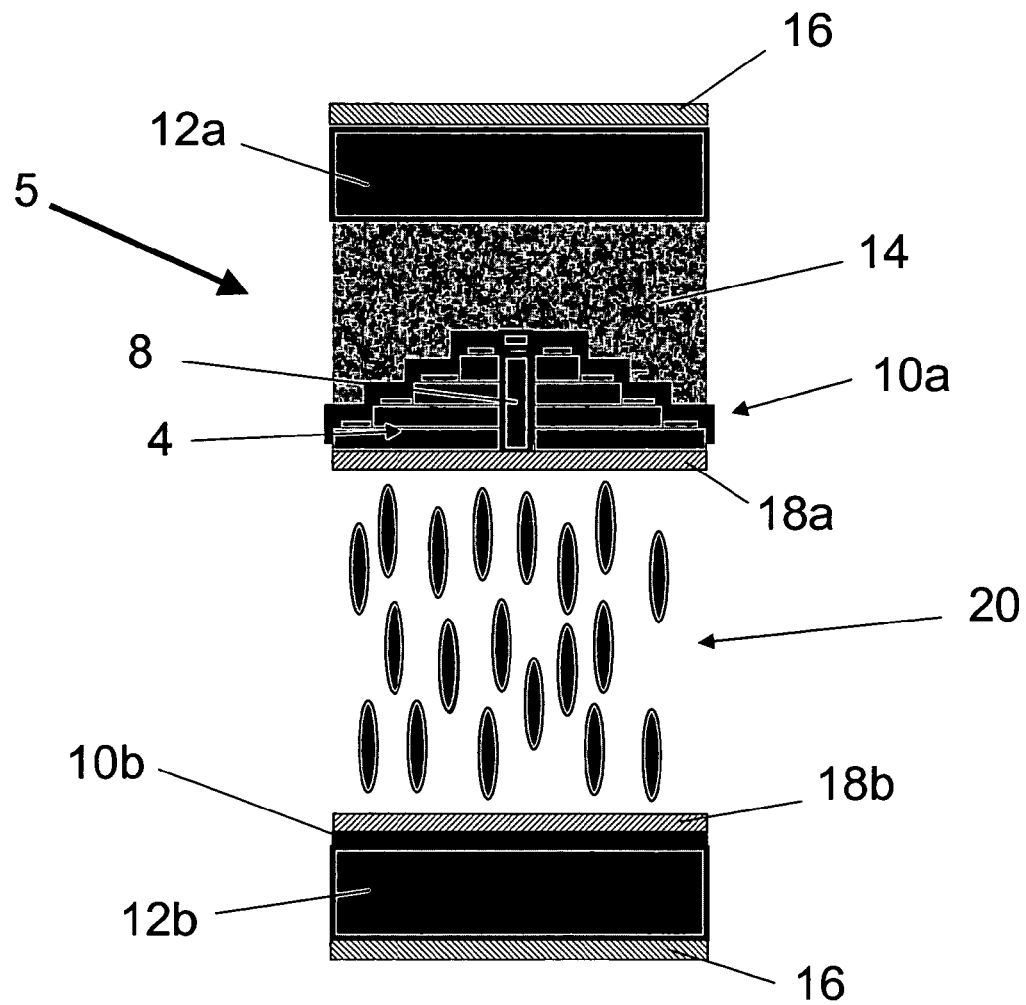
FIG. 5 is a schematic sectional view through part of a liquid crystal display device in accordance with another aspect of the invention.

Turning now to FIG. 5, a display device with greyscale capability 22 comprises the cell wall assembly 5 of FIG. 2b, including a first cell wall 12a and first electrode structures 10a, formed as previously described and in ohmic contact with the busbar 8. The device 22 in this example is a liquid crystal display device and has a layer of electro-optic material 20 which comprises a nematic LC. A first surface alignment 18a is provided on the innermost surface of the cell wall assembly 5. The surface alignment 18a in this example comprises a PABN surface textured with posts to provide bistable alignment to adjacent molecules of the nematic LC material 20. Other bistable alignments could be used, or conventional alignment materials such as rubbed polyimide if the display is monostable, for example a supertwist or HAN cell.

A second cell wall 12b is of conventional construction, being formed from a flat glass or plastics material and having second electrode structures 10b formed thereon by a conventional etch technique using ITO. A second surface alignment 18b is provided on the second electrode structures 10b, in this example inducing homeotropic alignment in adjacent LC molecules. Means for distinguishing between different optical states are provided, in this example polarisers 16 which are adhered to the outer surfaces of the cell walls 12. It will be understood that surface alignments 18 could be transposed; ie the PABN surface alignment could be provided on the innermost surface of the second cell wall and the homeotropic surface alignment could be provided on the first cell wall assembly 5. The second cell wall 12b may be spaced apart from the first cell wall assembly 5 by conventional spacing means (not shown) for example microbeads or pieces of glass fibre or polymer fibre. Suitable spacing means are well known to those skilled in the art of LCD manufacture.

The inner surfaces of both cell walls 12 are substantially planar and parallel to each other, and the layer of nematic LC material 20 is of substantially constant thickness. The shortest distance between the LC material 20 and one of the first electrode structures 10a varies within the area of the pixel illustrated in FIG. 5. Above a maximum threshold voltage all of the visible pixel area is in an 'on' state. For a bistable display, when the voltage is reduced or removed the pixel remains in the 'on' state. To switch the pixel to an 'off' state, a suitable pulse is applied.

Figure 6:
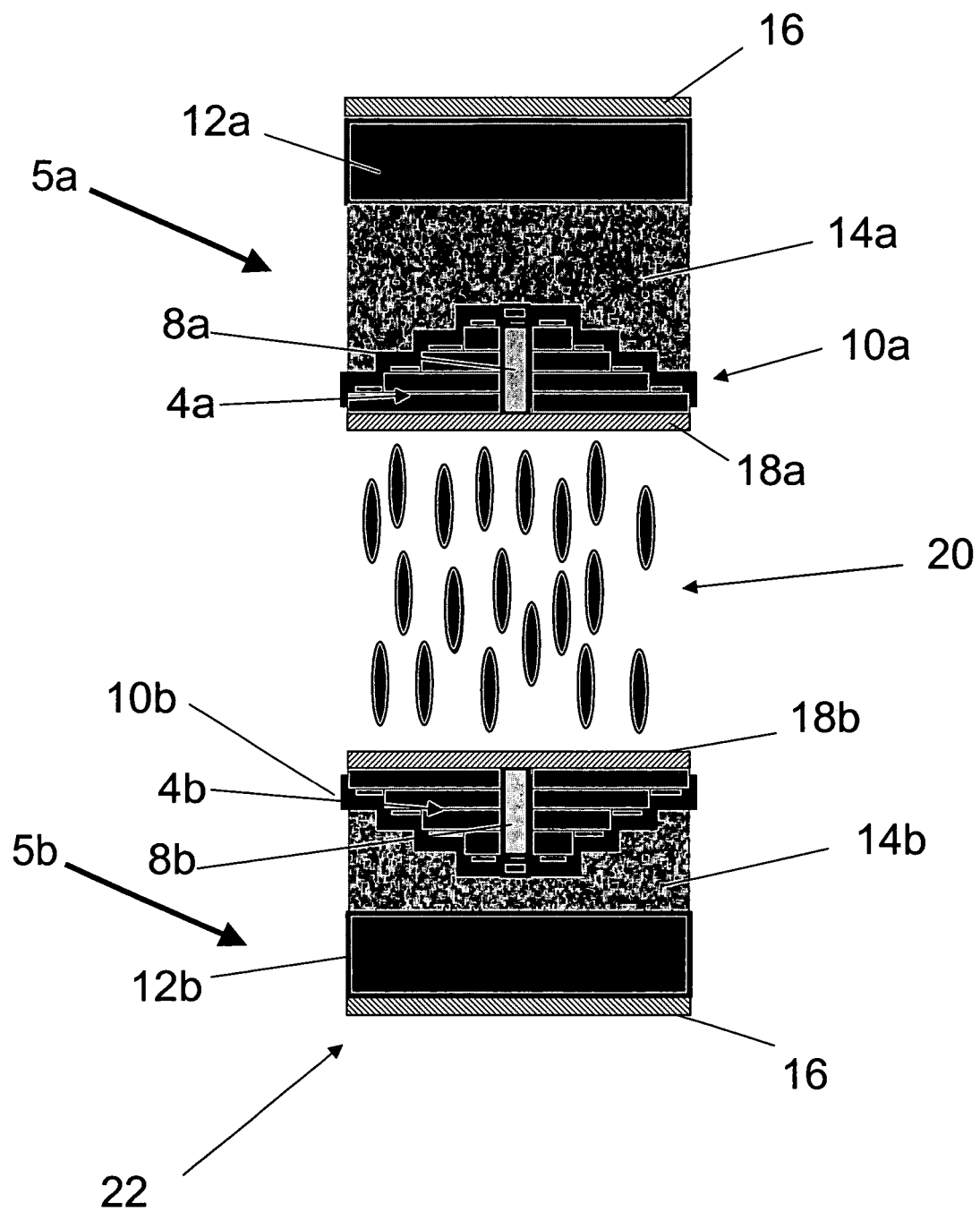
FIG. 6 is a schematic sectional view similar to that of FIG. 5, through part of a device in accordance with a further alternative embodiment.

The LCD of FIG. 6 is similar to that of FIG. 5 except that the second cell wall assembly 5b is constructed similarly to that of the first cell wall assembly 5a. Dielectric steps 4b separate the second electrode structures 10b from the LC 20. The second cell wall assembly 5b may be constructed by a similar transfer method to that used to make the first cell wall assembly 5a. The transparent adhesive 14b of the second cell wall assembly 5b may be formed of the same adhesive material as the transparent adhesive 14a of the first cell wall assembly. In this arrangement, the shortest distance between the LC material 20 and one of the first electrode structures 10a varies within the area of the pixel, as does the shortest distance between the LC material 20 and one of the second electrode structures 4b. In this arrangement the cell may be symmetrical in a plane through the LC layer 20 parallel to the cell walls 12 and may be more easily constructed because the electrode variation may be shared between the two cell wall assemblies.

Figure 7:
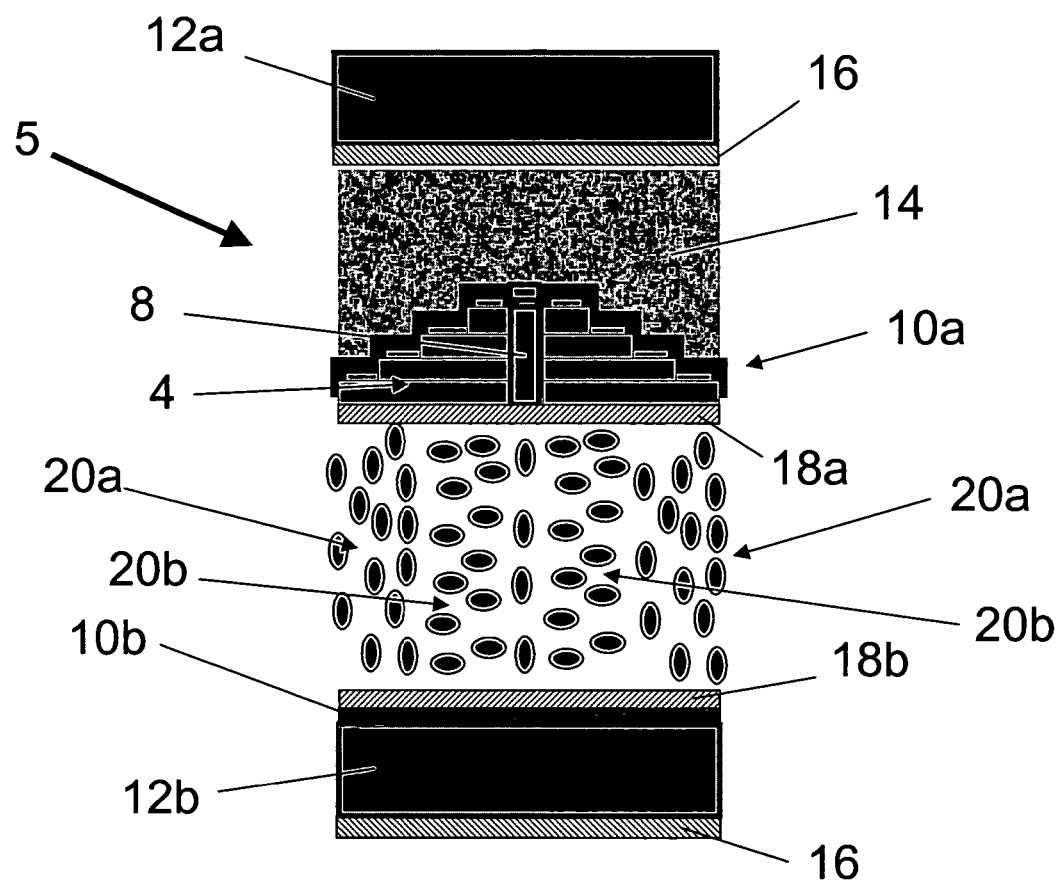
FIG. 7 is a similar view to FIG. 5, of another embodiment of a liquid crystal display device in accordance with an aspect of the invention.

FIG. 7 illustrates an alternative embodiment of a bistable LCD in which the polariser 16 on the upper cell wall 12a is provided on an inner surface, in this example between the first cell wall 12a and the adhesive 14, so that birefringence of the first cell wall 12a does not affect the display appearance. The switching voltage differs according to the shortest distance of the electrode structure 10a and the LC molecules 20. Each dielectric step 4 increases the switching threshold voltage. In order to switch the LC between stable states the electric field applied across the LC has to exceed a threshold. By putting the dielectric step between the electrode and the LC the electric field experienced by the LC will be reduced. Thus the applied voltage needed to switch the LC can be controlled by varying the thickness of the steps. In the illustration in FIG. 7, sufficient voltage has been applied via electrode structures 10a and 10b to align LC molecules 20a, in the outer regions, in the 'on' state. The applied voltage was insufficient to switch LC molecules 20b, in inner regions, from the 'off' state. Increasing the amplitude of a switching pulse will cause more of the steps to switch and hence increase the proportion of the device that switches into one of the two states, ultimately reaching a fully-switched state as illustrated in FIG. 5. The eye averages the areas of the pixel that are in each state to give a perceived grey level. LC molecules under the busbar 8 in FIG. 7 are switched, but are not visible under the opaque busbar. The busbar is narrow (about 5 µm) so is not readily visible.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the fair spirit and scope of the present invention as specified in the claims.

The disclosures in United Kingdom patent application No. 0423134.6, from which this application claims priority, and in the abstract accompanying this application are incorporated herein by reference.

What is claimed is:

1. A method of manufacturing a cell wall assembly for an electro-optic display device with greyscale capability, the method comprising:

forming on a substantially planar surface of a transfer carrier, at least one dielectric structure, wherein said surface of said transfer carrier is electrically conductive, forming on said at least one dielectric structure at least one electrode structure;

wherein said dielectric structure extends in a direction perpendicular to said surface by a distance which varies substantially within the area of the or each electrode structure;

adhering said at least one electrode structure to a major surface of a substrate of glass or a plastics material;

removing the transfer carrier thereby resulting in a cell wall assembly with a substantially planar surface; and forming at least one busbar on said surface of said transfer carrier and within said dielectric structure by electro-deposition of a metal.

2. A method according to claim 1, wherein the step of adhering said at least one electrode structure to a major surface of a substrate comprises adhering said at least one electrode structure to a polariser affixed to said substrate.

3. A method according to claim 1, wherein the or each electrode structure is in electrical contact with a corresponding busbar.

4. A method according to claim 1, wherein the step of forming a said at least one electrode structure comprises:

forming a transparent conductor layer on said at least one dielectric structure;

applying a layer of photoresist material to said conductor layer;

illuminating said photoresist material through a suitable mask with UV light of sufficient intensity and duration to effect a chemical change in exposed regions of said photoresist;

removing either photoresist which has been exposed or photoresist which has not been exposed; and etching said conductor layer in regions where said photoresist has been removed, thereby forming at least one transparent electrode structure.

5. A method according to claim 1, wherein the step of forming at least one dielectric structure comprises forming a series of dielectric structures each of which has a length and a width and which extends in a direction perpendicular to said surface by a distance which varies substantially within said width, each dielectric structure comprising electrode-receiving surface regions separated by a levee, adjacent dielectric structures being spaced apart to define a trench therebetween; further comprising the step of forming busbars by electrodepositing a metal to at least partially fill each of said trenches; and wherein said step of forming at least one electrode structure comprises depositing a layer of a translucent conductor material on said electrode-receiving surface regions and in contact with said busbars to form a series of electrode structures defined by said levees; and wherein the step of adhering said at least one electrode structure to a major surface of a substrate comprises affixing said electrode structures and levees to said major surface of said substrate by means of a dielectric adhesive material.

6. A method according to claim 5, wherein said translucent conductor is deposited via an inkjet print head.

7. A method according to claim 5, wherein each levee is joined to an adjacent surface region by a radiused portion.

8. A method according to claim 1, wherein the or each electrode structure has a length and a width and wherein the or each dielectric structure extends in a direction perpendicular to said surface by a distance which varies substantially within said width.

9. A method according to claim 1, wherein the or each dielectric structure extends in a direction perpendicular to said surface by a distance which varies substantially within an area of 200 pm×200 pm.

* * * * *

UNITED STATES PATENT AND TRADEMARK OFFICE
CERTIFICATE OF CORRECTION

PATENT NO. : 8,599,326 B2
APPLICATION NO. : 11/234539
DATED : December 3, 2013
INVENTOR(S) : Stephen Christopher Kitson et al.

It is certified that error appears in the above-identified patent and that said Letters Patent is hereby corrected as shown below:

In the Claims

In column 12, line 36, in Claim 9, delete "pm×200 pm." and insert -- µm×200 µm. --, therefor.

Signed and Sealed this
Eighteenth Day of March, 2014

Michelle K. Lee
*Deputy Director of the United States Patent and Trademark Office*